(12) United States Patent
Asai

(10) Patent No.: US 7,784,847 B2
(45) Date of Patent: Aug. 31, 2010

(54) SUN VISOR FOR VEHICLES

(75) Inventor: Takashi Asai, Toyota (JP)

(73) Assignee: Kyowa Sangyo Co., Ltd., Toyota-Shi, Aichi-Ken (JP)

( * ) Notice: Subject to any disclaimer, the term of this patent is extended or adjusted under 35 U.S.C. 154(b) by 0 days.

(21) Appl. No.: 12/277,823

(22) Filed: Nov. 25, 2008

(65) Prior Publication Data
US 2009/0134657 A1 May 28, 2009

(30) Foreign Application Priority Data
Nov. 27, 2007 (JP) ............................ 2007-305682

(51) Int. Cl.
*B60J 3/02* (2006.01)
(52) U.S. Cl. ................. 296/97.11; 296/97.1; 296/97.12
(58) Field of Classification Search ............... 296/97.1, 296/97.11, 97.5, 97.6, 97.8, 97.9, 97.12, 296/97.13, 97.4
See application file for complete search history.

(56) References Cited

U.S. PATENT DOCUMENTS

| 4,582,356 | A | | 4/1986 | Kaiser et al. | |
|---|---|---|---|---|---|
| 5,533,776 | A | * | 7/1996 | Agro et al. | 296/97.9 |
| 5,653,490 | A | * | 8/1997 | Fink et al. | 296/97.11 |
| 6,139,083 | A | * | 10/2000 | Fischer et al. | 296/97.11 |
| 7,032,949 | B1 | * | 4/2006 | Wang et al. | 296/97.9 |
| 7,090,281 | B2 | * | 8/2006 | Davey et al. | 296/97.11 |
| 7,384,088 | B2 | * | 6/2008 | Remy | 296/97.11 |
| 2006/0138799 | A1 | * | 6/2006 | Wang et al. | 296/97.11 |
| 2006/0175869 | A1 | * | 8/2006 | Torii et al. | 296/187.05 |

FOREIGN PATENT DOCUMENTS

JP 60197426 5/1985

* cited by examiner

*Primary Examiner*—Patricia L Engle
*Assistant Examiner*—SunSurraye Westbrook
(74) *Attorney, Agent, or Firm*—Dennison, Schultz & MacDonald

(57) ABSTRACT

It is an object of the invention to provide a technique which contributes to stabilized movement of a sliding structure in a slide-type sun visor for vehicles. Representative sun visor for vehicles includes a sun visor body, a support shaft, a sliding member, a clip member and a clamping device. The clamping device accommodates a clearance in a circumferential direction between the support shaft and the sliding member and prevents relative rotation of the support shaft and the sliding member. The clamping device is mounted to the sliding member and rotates together with the sliding member.

14 Claims, 6 Drawing Sheets

SUN VISOR FOR VEHICLES

FIELD OF THE INVENTION

The present invention relates to a slide-type sun visor for vehicles, having a sun visor body which is capable of moving in a longitudinal direction of a support shaft along the support shaft which connects the sun visor body to a vehicle body.

DESCRIPTION OF THE RELATED ART

A slide-type sun visor for vehicles, having a sun visor body which is capable of sliding in a longitudinal direction of a support shaft with respect to the support shaft which connects the sun visor body to a vehicle body, is disclosed, for example, in Japanese non-examined laid-open Patent Publication No. 60-197426. In this sun visor, the sun visor body has a sleeve that can slide with respect to a horizontal shaft part of the support shaft. The sun visor body can change its position in the longitudinal direction of the support shaft by sliding along the support shaft via the sleeve.

The sleeve has two contact regions (chamfers) which are formed parallel to each other for plane contact with the support shaft. With the contact regions, the sleeve is allowed to move with respect to the support shaft in the longitudinal direction of the support shaft, while being prevented from rotating with respect to the support shaft. Further, the sleeve is held by the spring force of the clip (spring) provided on the sun visor body. As a result, by frictional resistance between the clip and the sleeve, the sun visor body is held in a position to which it pivots around the horizontal shaft portion of the support shaft.

The above-described known slide-type sun visor for vehicles has a slide structure having two parallel contact regions in which the support shaft and the sleeve contact each other in plane and are fitted together. Therefore, if a clearance is created in the fitted region due to a margin of error in manufacturing, a rattle may be caused when the sun visor body pivots around the axis of the support shaft in order to change its position in the vertical direction. Further, the sliding load of the sun visor body may become unstable during sliding operation of the sun visor body. In these points, further improvement is required.

SUMMARY OF THE INVENTION

Accordingly, it is an object of the present invention to provide a technique which contributes to stabilized movement of a sliding structure in a slide-type sun visor for vehicles.

In order to overcome the above-described problems, the present invention provides a sun visor for vehicles, having a sun visor body, a support shaft, a sliding member and a clip member. The support shaft is provided as an elongate member for connecting the sun visor body to a vehicle body. The sliding member is arranged to be allowed to rotate around an axis of the support shaft with respect to the sun visor body and prevented from moving in a longitudinal direction of the support shaft with respect to the sun visor body. Further, the sliding member is engaged on the support shaft in such a manner as to be allowed to slide in the longitudinal direction of the support shaft with respect to the support shaft and prevented from rotating around the axis of the support shaft with respect to the support shaft. The clip member is fastened to the sun visor body and moved together with the sliding member in the longitudinal direction of the support shaft. Further, the clip member is allowed to rotate with respect to the sliding member around the axis of the support shaft while applying a predetermined load with respect to the relative rotation, thereby holding the sun visor body in a position to which the sun visor body pivots around the axis of the support shaft with respect to the support shaft. The sun visor body can change its position in the longitudinal direction of the support shaft by sliding in the longitudinal direction of the support shaft together with the clip member and the sliding member. The slide-type sun visor for vehicles according to this invention is thus constructed.

Further, the "sliding member" in this invention typically comprises a cylindrical member (sleeve). The sliding member is fitted onto the support shaft via their respective regions having a non-circular section, so that the sliding member and the support shaft are allowed to move with respect to each other in the longitudinal direction of the support shaft and prevented from rotating with respect to each other around the axis of the support shaft. Therefore, the "engagement" in this invention typically represents the manner in which plane regions come to plane contact with each other in a predetermined region in the circumferential direction, but it also suitably includes the manner in which a groove having a V- or U-shaped section engages with a projection having a V- or U-shaped section. Further, the structure for fitting the sliding member onto the support shaft suitably includes a structure in which the contact region of the sliding member which has a non-circular section and is designed to contact the support shaft extends either along the entire length of the sliding member or in part along its length in the longitudinal direction (the sliding direction).

In a preferred embodiment of the invention, the sun visor further includes a clamping device that accommodates a clearance in a circumferential direction between the support shaft and the sliding member and prevents relative rotation of the support shaft and the sliding member. The clamping device is mounted to the sliding member and rotates together with the sliding member. Further, the manner of "accommodating a clearance in a circumferential direction" represents the manner in which the clamping device applies a force to the support shaft so as to maintain the state of contact between the support shaft and the sliding member in the circumferential direction by utilizing the elastic force of the clamping device.

According to this invention, the clamping device is provided which accommodates a clearance in the circumferential direction between the support shaft and the sliding member and prevents relative rotation of the support shaft and the sliding member. With this construction, a rattle in the circumferential direction between the support shaft and the sliding member around the axis of the support shaft can be prevented. Further, the clamping device is mounted to the sliding member and rotates together with the sliding member. Therefore, a rattle between the support shaft and the sliding member can be prevented wherever the sun visor body is placed within the allowable range of rotation when the sun visor body pivots around the axis of the support shaft with respect to the support shaft.

In a further aspect of the present invention, the clamping device comprises an elastically deformable elastic member. The clamping device applies a spring force to the support shaft from a radial direction in such a manner as to maintain the state of contact with the sliding member, and thereby accommodates the clearance. According to this invention, a rattle between the support shaft and the sliding member around the axis of the support shaft can be rationally prevented by utilizing the elastic force of the clamping device.

In a further aspect of the present invention, the clamping device is prevented from moving with respect to the sliding member in the longitudinal direction of the sliding member. Therefore, over the entire sliding region of the sun visor body or the entire region of relative movement of the sliding member with respect to the support shaft, the clamping device performs its function of preventing a rattle between the support shaft and the sliding member, and the sliding load is stabilized.

In a further aspect of the present invention, a plurality of contact regions are provided in the circumferential direction between the support shaft and the sliding member and contact each other in order to prevent relative rotation of the support shaft and the sliding member. Further, the "contact regions" in this invention represent regions that contact each other by a force of the clamping device acting in a direction that brings the support shaft and the sliding member into contact with each other. The manner of contact between the support shaft and the sliding member suitably includes not only plane contact between planes of the support shaft and the sliding member, but also line contact between a plane and a plurality of lines, point contact between a plane and a plurality of points, or a combination of these contacts. According to this invention, the clamping device holds the support shaft and the sliding member in contact with each other via a plurality of contact regions in the circumferential direction. Therefore, the sliding load of the sun visor body which is caused upon relative movement of the sun visor body together with the sliding member in the longitudinal direction of the support shaft can be defined by a frictional resistance (frictional force) acting upon the contact regions. The magnitude of the sliding load can be arbitrarily set by adjusting a force of pressing the contact regions of the support shaft and the sliding member against each other by the spring force of the clamping device.

In a further aspect of the present invention, the clamping device is configured to maintain the state of contact of the contact regions at all times. Further, the manner in which the clamping device is "configured to maintain the state of contact of the contact regions at all times" represents the manner in which the clamping device applies a spring force to the support shaft and the sliding member in such a manner as to maintain the state of contact of the contact regions. According to this invention, the contact regions are continuously held in contact with each other even if they are worn, so that the durability can be improved.

In a further aspect of the present invention, the support shaft and the sliding member have two contact regions provided in the circumferential direction therebetween for contact with each other in order to prevent relative rotation of the support shaft and the sliding member, and the two contact regions have respective plane regions of which vertical directions intersect with each other. According to this invention, variations in finished dimensions of the support shaft and the sliding member with respect to each other can be rationally accommodated, so that the movement can be stabilized. Further, the "plane regions" in this invention may be formed on one side, or either on the support shaft or the sliding member, in both of the contact regions, or they may be formed on the support shaft in one of the contact regions, while on the sliding member in the other contact region. Further, the manner of contact in the two contact regions may be point contact between a plane region and a plurality of points, plane contact between a plane region and a plane, or line contact between a plane region and a plurality of lines.

In a further aspect of the present invention, the support shaft and the sliding member have two contact regions provided in the circumferential direction therebetween for contact with each other in order to prevent relative rotation of the support shaft and the sliding member, and each of the two contact regions comprises at least two line contact parts formed on the support shaft and at least two line contact parts formed on the sliding member for cross contact with the line contact parts of the support shaft. The line contact parts in the two contact regions are arranged such that their vertical directions intersect with each other. According to this invention, contact regions for preventing relative rotation of the support shaft and the sliding member can be constructed, without using plane regions, by providing line contact parts on the support shaft and the sliding member for cross contact with each other.

In a further aspect of the present invention, the clamping device and the sliding member have a contact region provided therebetween and inclined with respect to a direction transverse to the longitudinal direction of the support shaft. In the state in which the clamping device is clamped to the sliding member, the clamping device applies a spring force to the support shaft and the sliding member via the inclined contact region in such a manner as to maintain the state of contact between the support shaft and the sliding member. Further, the manner of contact of the "inclined contact region" between the clamping device and the sliding member in this invention suitably includes not only plane contact between planes of the clamping device and the sliding member, but also line contact between a plane and a line, or point contact between a plane and a point. According to this invention, a rattle between the support shaft and the sliding member around the axis of the support shaft can be prevented, so that the movement can be stabilized.

Other objects, features and advantages of the present invention will be readily understood after reading the following detailed description together with the accompanying drawings and the claims.

REPRESENTATIVE EMBODIMENT OF THE INVENTION

Each of the additional features and method steps disclosed above and below may be utilized separately or in conjunction with other features and method steps to provide and manufacture improved sun visors and method for using such sun visors and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
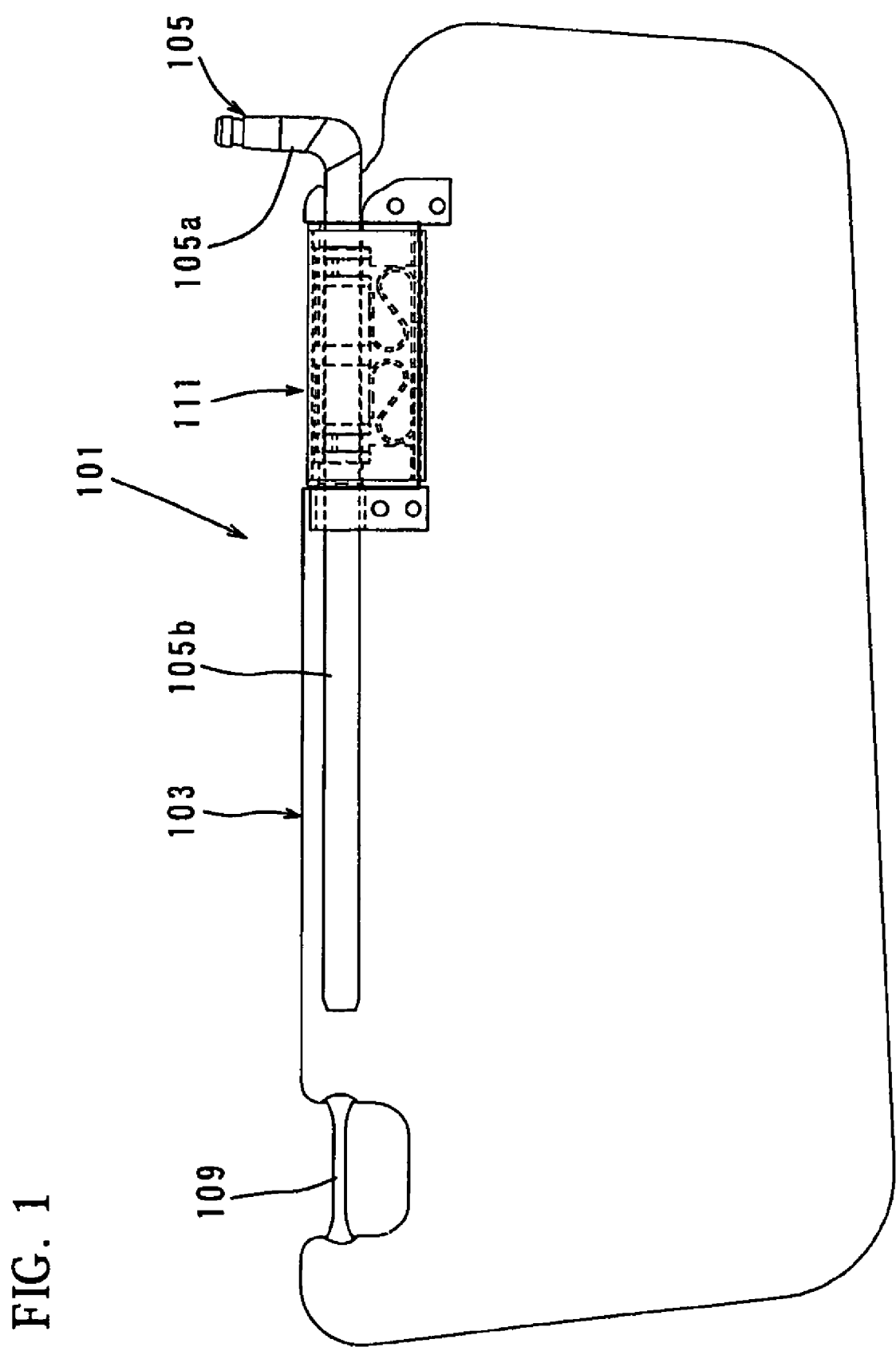
FIG. 1 is a front view schematically showing the entire construction of a sun visor for vehicles according to an embodiment of the present invention, in which one of the two halves forming a sun visor body is not shown.

A sun visor 101 for vehicles according to a representative embodiment of the present invention is now described with reference to FIGS. 1 to 5. FIG. 1 schematically shows the entire construction of the sun visor 101. As shown in FIG. 1, the sun visor 101 mainly includes a sun visor body 103, a support shaft 105 having a circular section and provided to mount the sun visor body 103 to the vehicle, and a mounting bracket which is not shown. The support shaft 105 is generally L-shaped having a generally vertically extending shaft portion 105a and a generally horizontally extending shaft portion 105b. The horizontal shaft portion 105b is mounted to an upper edge of the sun visor body 103 such that the sun visor body 103 can pivot with respect to the horizontal shaft portion 105b. The vertical shaft portion 105a of the support shaft 105 is pivotally mounted to the front corner of the interior roof surface of the vehicle via the mounting bracket.

The sun visor body 103 is mounted onto the horizontal shaft portion 105b of the support shaft 105 such that it can pivot around the axis of the horizontal shaft portion 105 and can slide in the longitudinal direction. The structure for such pivotal and sliding movement will be described below. For the sake of explanation, in FIG. 1, the longitudinal direction of the horizontal shaft portion 105b or the sliding direction is referred to as a lateral direction, the longitudinal direction of the vertical shaft portion 105a to as a vertical direction, a horizontal direction transverse to the longitudinal direction of the horizontal shaft portion 105b to as a longitudinal direction of the vehicle.

The sun visor body 103 can pivot around the axis of the horizontal shaft portion 105b of the support shaft 105 such that it can change in position between a storage position along the interior roof surface and a use position (shading position) along the windshield. Further, the sun visor body 103 can pivot around the axis of the vertical shaft portion 105a such that it can change in position between the front position along the windshield and a side position along a side window. Further, the sun visor body 103 can be slid in the longitudinal direction of the horizontal shaft portion 105b such that it can change in position (shading position) with respect to the side window.

Further, a support shaft 109 is provided on the free end portion of the upper edge of the sun visor body 103. The support shaft 109 is supported by a hook (not shown) mounted on a front interior roof surface in the vehicle. In this manner, the pivotal movement of the sun visor body 103 between the storage position and the shading position can be stabilized when the sun visor body 103 is in the forward windshield position.

The sun visor body 103 has two halves (not shown) opposed to each other in the longitudinal direction and joined together so as to form a hollow shell structure. The outer surface of the sun visor body 103 is covered with a skin. A sliding structure 111 is incorporated in the hollow inner space of the sun visor body 103 and allows the pivotal movement and longitudinal sliding movement of the sun visor body 103 with respect to the horizontal shaft portion 105b of the support shaft 105. In FIG. 1, one of the two halves forming the sun visor body 103 is not shown.

Figure 2:
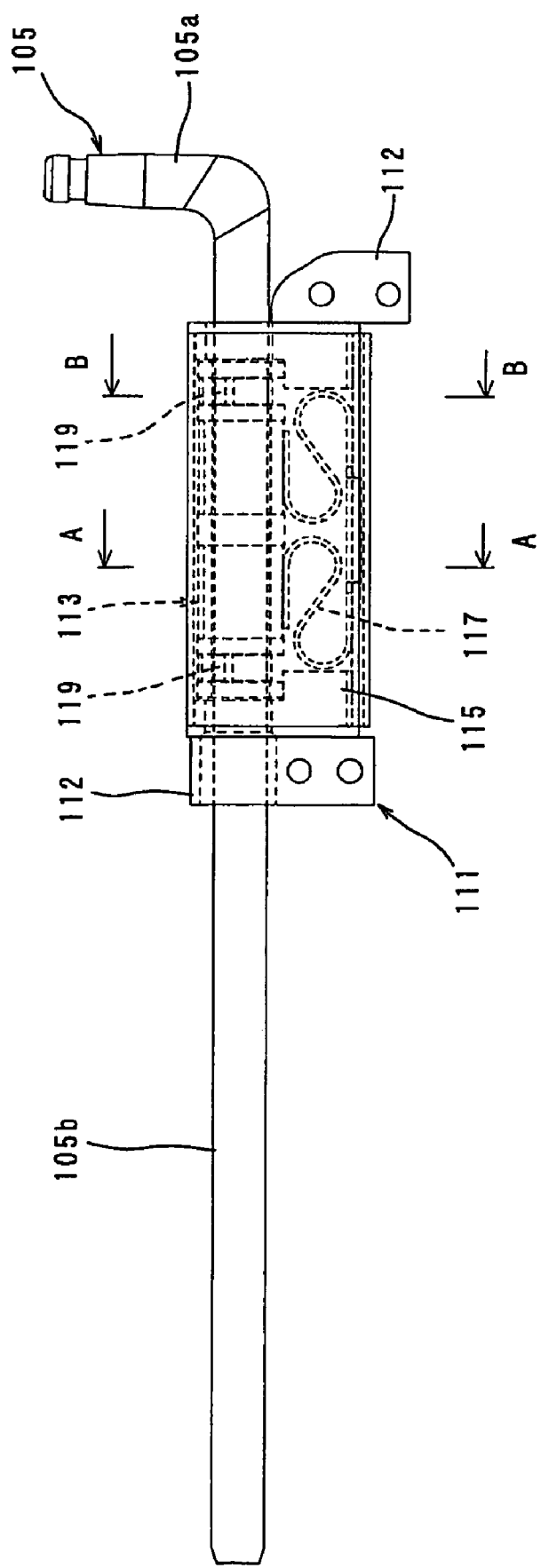
FIG. 2 is a front view showing a sliding structure.
Figure 3:
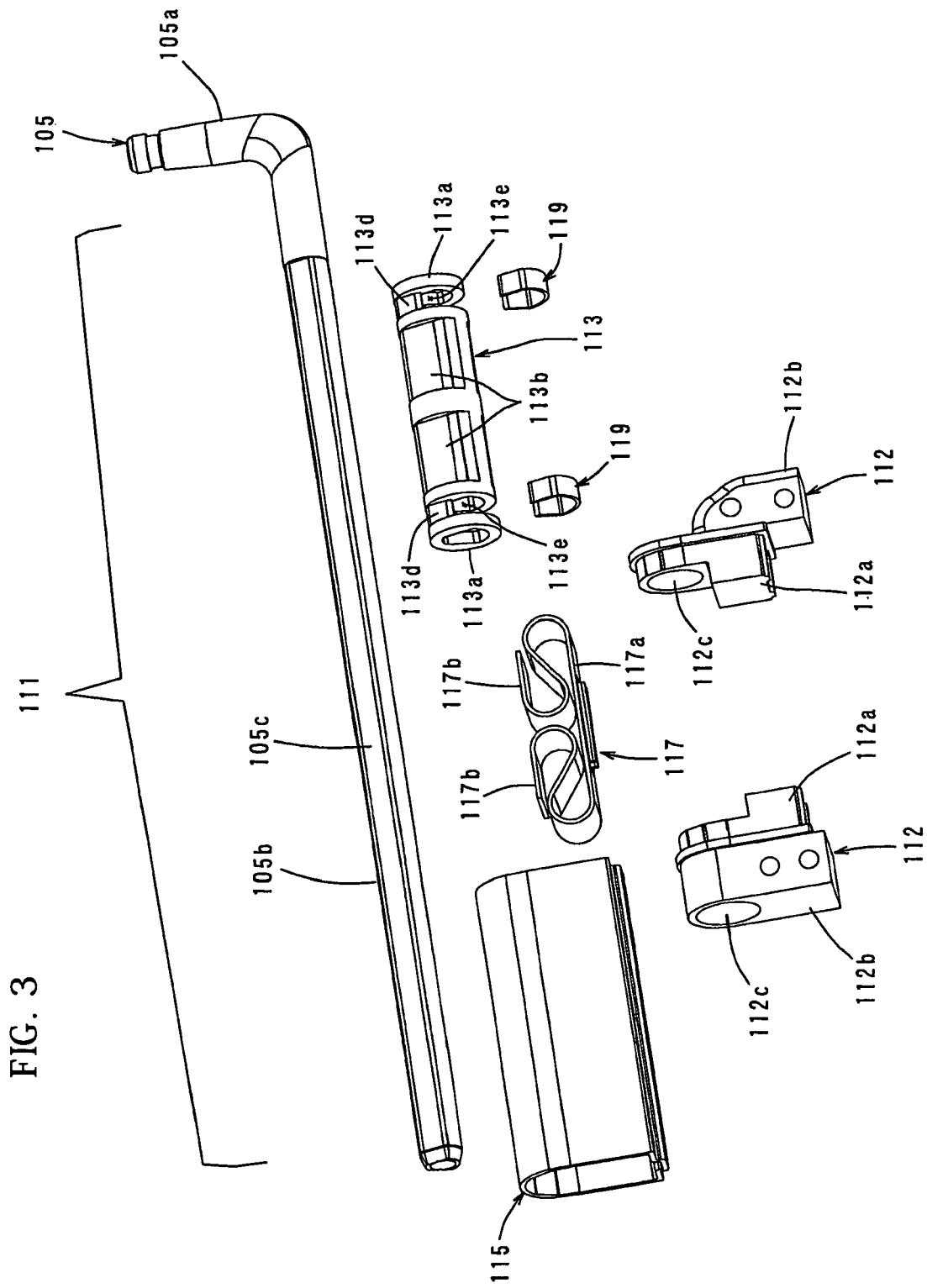
FIG. 3 is a perspective exploded view showing the sliding structure.
Figure 4:
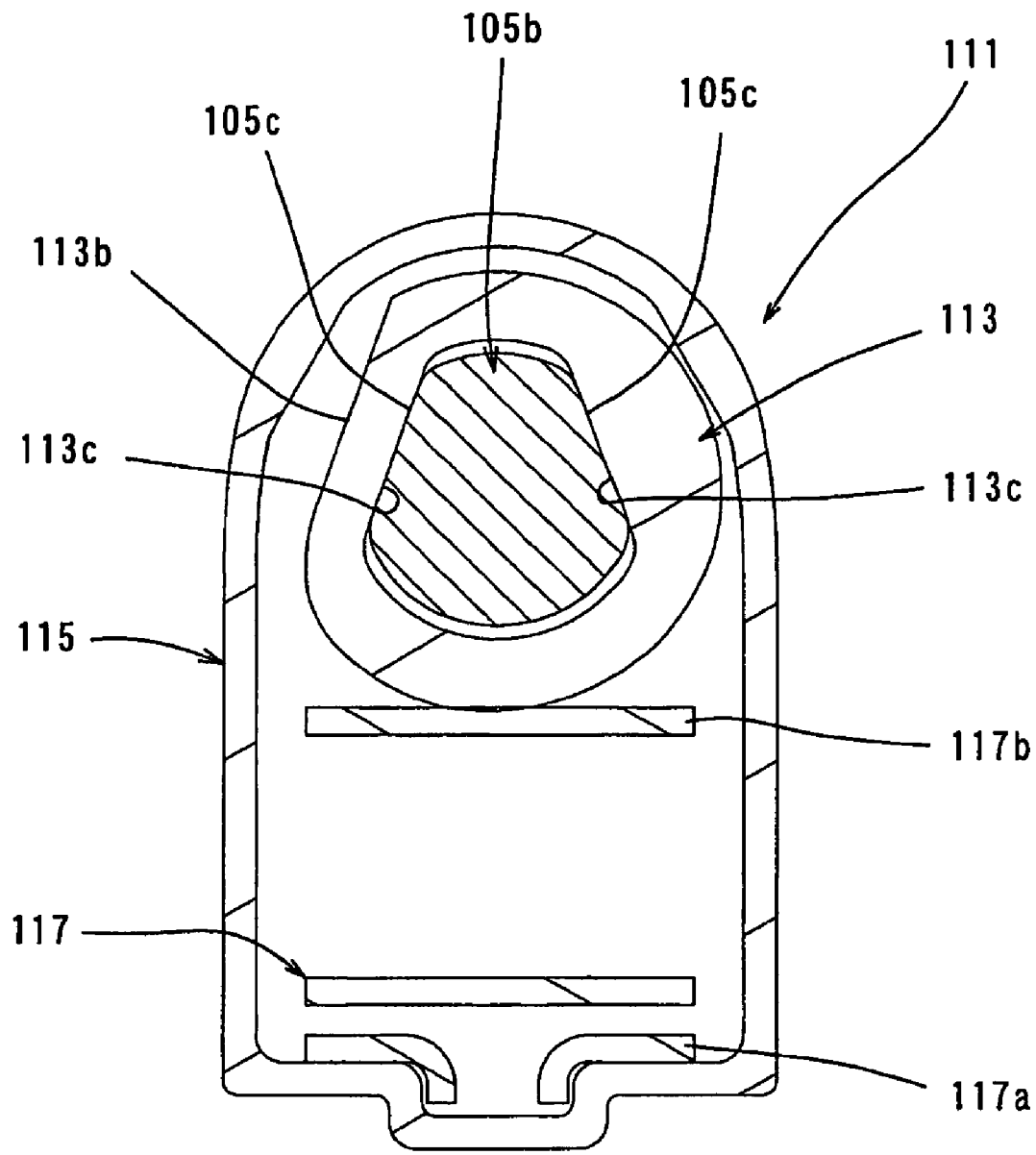
FIG. 4 is a sectional view taken along line A-A in FIG. 2.
Figure 5:
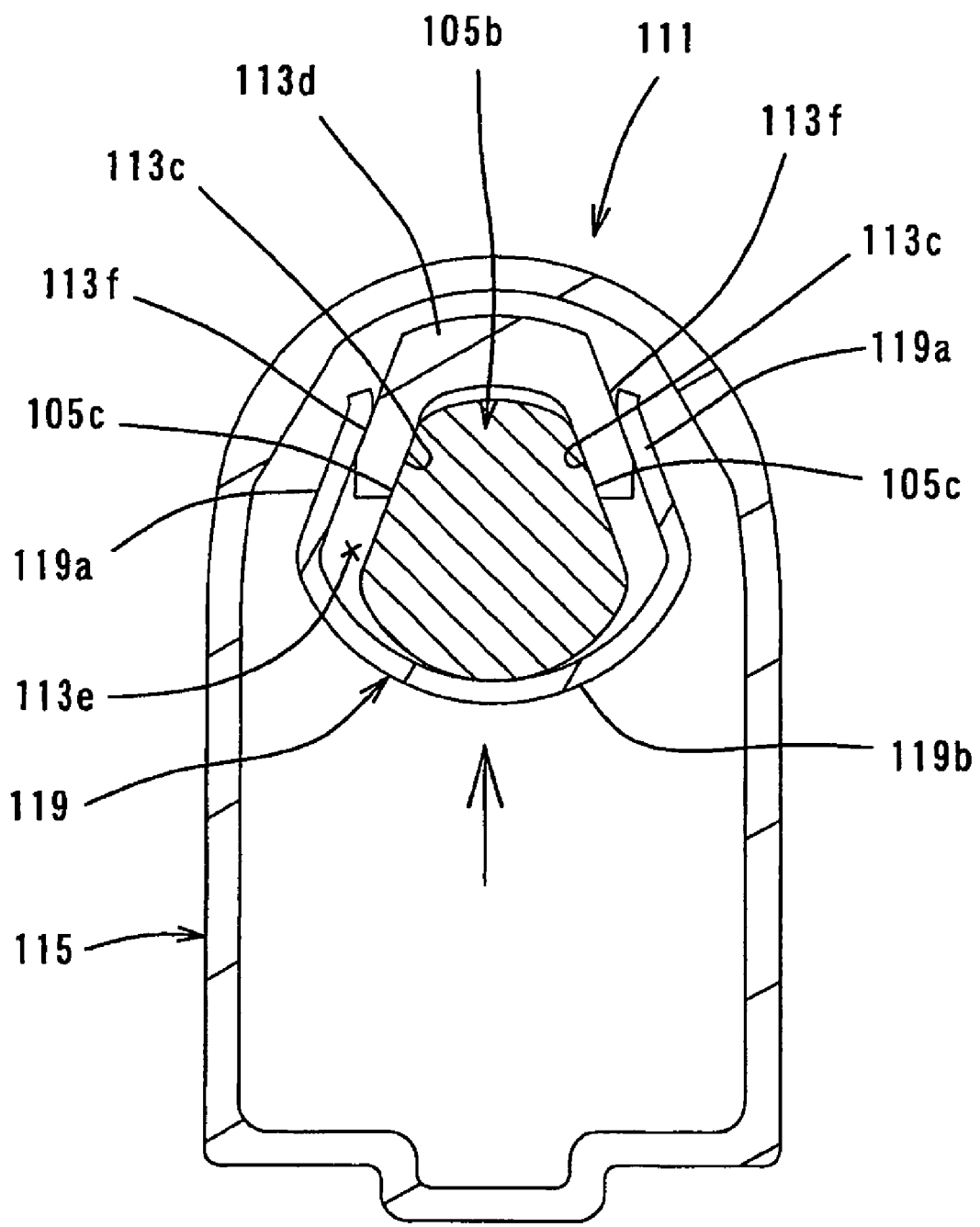
FIG. 5 is sectional view taken along line B-B in FIG. 2.

Next, the sliding structure 111 is described with reference to FIGS. 2 to 5. FIG. 2 shows the sliding structure 111, and FIG. 3 shows the sliding structure 111 in the disassembled state. Further, FIGS. 4 and 5 are sectional views taken along line A-A and line B-B in FIG. 2.

According to this embodiment, the sliding structure 111 includes a case 115, right and left supports 112, a slide sleeve 113 which is housed within the case 115, a spring clip 117 which is housed within the case 115 and serves to control the rotating torque of the sun visor body 103, and right and left clamping clips 119 which serve to define the sliding load of the sun visor body 103 and accommodates a clearance formed between the horizontal shaft portion 105b of the support shaft 105 and the slide sleeve 113 in the circumferential direction.

The case 115 has a tubular shape having a generally arched section. Each of the right and left supports 112 has an insert portion 112a having an outer shape which conforms to the shape of the tubular hole of the case 115. The insert portion 112a is press fitted into the end of the tubular hole of the case 115. Each of the right and left supports 112 has a mounting leg 112b which is fastened to the inside of one of the two halves of the sun visor body 103, for example, by a screw, as shown in FIG. 1. Further, as shown in FIG. 3, each of the right and left supports 112 has a circular support hole 112c.

The slide sleeve 113 designed to be housed within the case 115 is generally cylindrical and has right and left circular portions 113a on the both ends in the longitudinal direction. The circular portions 113a are loosely fitted into the support holes 112c of the right and left supports 112 and can rotate with respect to the associated supports 112. The slide sleeve 113 is a feature that corresponds to the "sliding member" according to this invention. The horizontal shaft portion 105b of the support shaft 105 is inserted through the slide sleeve 113 in the longitudinal direction. The horizontal shaft portion 105b has two inclined surface regions 105c formed symmetrically with respect to its axis and extending generally along its entire length. The horizontal shaft portion 105b thus has a generally triangular section tapered upward generally along the entire length. Inclined surface regions 113c which conform to the inclined surface regions 105c of the horizontal shaft portion 105b are formed in the inner wall surface of the slide sleeve 113. Specifically, as shown in FIGS. 4 and 5, the slide sleeve 113 and the horizontal shaft portion 105b engage with each other via the inclined surface regions 105c, 113c which are in plane contact with each other and the normals to the contact surfaces intersect with each other. Thus, the slide sleeve 113 and the horizontal shaft portion 105b can slide with respect to each other in the longitudinal direction of the horizontal shaft portion 105b and are prevented from rotating with respect to each other around the axis of the horizontal shaft portion 105b. The inclined surface regions 105c, 113c are features that correspond to the "contact regions" according to this invention.

With the above-described construction, the pivotal movement of the sun visor body 103 is effected by the pivotal movement of the right and left supports 112 together with the case 115 around the circular portions 113a of the slide sleeve 113. Further, the sliding movement of the sun visor body 103 is effected by the sliding movement of the slide sleeve 113 together with the case 115 along the horizontal shaft portion 105b.

The spring clip 117 has a base 117a and a first and a second elastic deflection parts 117b extending upward from the both ends of the base 117 generally into the form of a letter S (see FIG. 3). By elastic deflection of the first and second elastic deflection parts 117b, the spring clip 117 contacts the outer surface of the slide sleeve 113 from the radial direction and applies a predetermined spring force to it. The spring clip 117 is a feature that corresponds to the "clip member" according to this invention. The spring clip 117 is fixedly mounted on the case 115. Thus, the spring clip 117 is slid together with the slide sleeve 113 in the longitudinal direction of the horizontal shaft portion 105b. Further, the spring clip 117 is allowed to rotate with respect to the slide sleeve 113 around the axis of the horizontal shaft portion 105b, while applying a predetermined load by the spring force with respect to this relative rotation, so that the sun visor body 103 is held in a position to which it pivots between the storage position and the use position.

Further, a notch 113b is formed in the outer surface of the slide sleeve 113 in part in the circumferential direction in the region of contact with the first and second elastic deflection parts 117b. When the sun visor body 103 pivots toward the storage position, the notch 113b and the first and second elastic deflection parts 117b engage with each other, which causes the spring force of the first and second elastic deflection parts 117b to be converted into the pivoting force for forcibly pivoting the sun visor body 103 toward the storage position. As a result, the sun visor body 103 is forcibly pivoted into the storage position and retained in the storage position.

In the sliding structure 111 having the above-described construction, a clearance may be created in the fitted region between the horizontal shaft portion 105b and the slide sleeve 113 due to a margin of error in manufacturing. In order to eliminate a rattle caused by this clearance and to prevent the horizontal shaft portion 105b and the slide sleeve 113 from rotating with respect to each other, the right and left clamping clips 119 are provided. The clamping clips 119 are features that correspond to the "clamping device" according to this invention.

The clamping clips 119 are formed of elastically deformable material, such as synthetic resin or metal. As shown in FIGS. 3 and 5, each of the clamping clips 119 has a generally triangular ring-like shape (generally horseshoe shape) with an open top. The clamping clips 119 are fitted over right and left clip mounting parts 113d in the slide sleeve 113 by utilizing its elasticity. As shown in FIG. 5, each of the clip mounting parts 113d has an open window 113e on the underside and the lower surface of the horizontal shaft portion 105b is exposed (protrudes) to the outside through the open window 113e. Further, the clip mounting part 113d has two mounting inclined surfaces 113f formed on its upper side symmetrically with respect to the axis of the slide sleeve 113. Specifically, the upper side of the clip mounting part 113d has a shape of a generally inverted V tapered upward.

Each of the clamping clips 119 has front and rear mounting legs 119a extending obliquely upward toward the opening of the clamping clip 119 and opposed to each other. The front and rear mounting legs 119a are fitted on the mounting inclined surfaces 113f of the clip mounting part 113d from the radial direction (below), or from a direction transverse to the mounting direction (longitudinal direction) of the horizontal shaft portion 105b to the slide sleeve 113. In this manner, the clamping clip 119 is fitted over the clip mounting part 113d. In this fitted state, the clamping clip 119 bears against the side wall of the clip mounting part 113d, or the wall surface in the direction transverse to the longitudinal direction of the horizontal shaft portion 105b, so that the clamping clip 119 is prevented from moving with respect to the slide sleeve 113 in the longitudinal direction. Further, the clamping clip 119 is arranged such that it does not protrude to the outside from the outer surface of the slide sleeve 113 in the fitted state, so that its useless interference with the inner surface of the case 115 is avoided.

The clamping clip 119 has a connecting region that connects the mounting legs 119a in the lower central portion of the inner wall surface of the clamping clip 119, which region forms a holding part 119b for the horizontal shaft portion 105b. The holding part 119b holds (contacts) the lower portion of the outer surface of the horizontal shaft portion 105b which is exposed through the open window 113e of the clip mounting part 113d. Further, in the mounted state of the clamping clip 119, the spring forces (clamping forces) of the mounting legs 119a act inward in directions that narrow the opening of the clamping clip 119, or in directions that hold the clip mounting part 113d of the slide sleeve 113 in front and in the rear between the mounting legs 119a. Therefore, reaction forces act upon the mounting legs 119a via the mounting inclined surfaces 113f of the clip mounting part 113d, and the mounting legs 119a tend to be moved upward by upward components of the reaction force. Specifically, the clamping clip 119 tends to move upward by its own spring force. As a result, the horizontal shaft portion 105b is pushed upward by the clamping clip 119, and the inclined surface regions 105c of the horizontal shaft portion 105b are pressed against the inclined surface regions 113c of the slide sleeve 113. The inclined surface regions 105c of the horizontal shaft portion 105b and the inclined surface regions 113c of the slide sleeve 113 are inclined with respect to the direction of action of the upward forces acting upon the horizontal shaft portion 105b. Therefore, manufacturing variations which may occur in the fitted region between the horizontal shaft portion 105b and the slide sleeve 113 can be accommodated. Specifically, the structure for fitting the slide sleeve 113 onto the horizontal shaft portion 105b is provided with no clearance in the fitted region in the circumferential and radial directions.

Thus, according to this embodiment, as shown in FIG. 5, the inclined surface region 105c of the horizontal shaft portion 105b is pressed against the inclined surface region 113c of the slide sleeve 113 by the spring force of the clamping clip 119. Therefore, the inclined surface region 105c of the horizontal shaft portion 105b is held in contact with the inclined surface region 113c of the slide sleeve 113 with no clearance therebetween, so that the horizontal shaft portion 105b and the slide sleeve 113 are prevented from rotating with respect to each other. As a result, when the sun visor body 103 pivots between the storage position and the use position, the horizontal shaft portion 105b and the slide sleeve 113 rotate together in the circumferential direction with respect to the spring clip 117. Therefore, the pivotal movement of the sun visor body 103 is stabilized without a rattle.

The sliding movement of the sun visor body 103 is effected by the sliding movement of the inclined surface region 113c of the slide sleeve 113 with respect to the inclined surface region 105c of the horizontal shaft portion 105b. In this case, the inclined surface region 105c of the horizontal shaft portion 105b is also held in plane contact with the inclined surface region 113c of the slide sleeve 113 with no clearance therebetween, so that the sliding movement of the sun visor body 103 is stabilized without a rattle. In this case, a sliding load (frictional resistance) acts between the inclined surface region 105c of the horizontal shaft portion 105b and the inclined surface region 113c of the slide sleeve 113 by the spring force of the clamping clip 119. The sliding load can be appropriately set by adjusting the magnitude of the spring force of the mounting legs 119a of the clamping clip 119, or by adjusting the inclination of the mounting inclined surfaces 113f of the slide sleeve 113.

Further, according to this embodiment, the clamping clip 119 is mounted on the slide sleeve 113 and rotates together with the slide sleeve 113 with respect to the sun visor body 103. Therefore, when the sun visor body 103 pivots between the storage position and the use position, the clamping clip 119 can continuously perform its function of preventing the horizontal shaft portion 105b and the slide sleeve 113 from rotating with respect to each other, wherever the sun visor body 103 is placed. Further, the clamping clip 119 is prevented from moving in the longitudinal direction of the slide sleeve 113 with respect to the slide sleeve 113. Specifically, the clamping clip 119 slides together with the slide sleeve 113 with respect to the horizontal shaft portion 105b. Therefore, when the sun visor body 103 slides along the horizontal shaft portion 105b, a sliding load is held unchanged wherever it is placed. Thus, the sliding load of the sun visor body 103 can be stabilized over its entire sliding region.

Further, the horizontal shaft portion 105b and the slide sleeve 113 are held in plane contact with each other via the inclined surface regions 105c, 113c in the direction of action of the force applied by the clamping clip 119. Therefore, a clearance in the fitted region between the horizontal shaft portion 105b and the slide sleeve 113 in the circumferential and radial directions can be accommodated. Further, the directions of the normals to the inclined surface regions 105c, 113c intersect with each other. Therefore, variations in finished dimensions of the fitted region of the horizontal shaft portion 105b and the slide sleeve 113 can be accommodated in a balanced manner.

Further, in this embodiment, the spring force of the clamping clip 119 acts in such a manner as to hold the horizontal shaft portion 105b and the slide sleeve 113 in plane contact with each other via the inclined surface regions 105c, 113c at all times. Thus, the contact surfaces of the inclined surface regions 105c, 113c can be continuously held in plane contact with each other even if they are worn. Therefore, the durability of the slide sleeve 113 or the horizontal shaft portion 105b can be improved.

Further, in this embodiment, the clamping clip 119 is shaped like a generally triangular ring with an open top. Thus, the clamping clip 119 is fitted, by utilizing the elasticity of the mounting legs 119a, over the associated clip mounting part 113d of the slide sleeve 113 from the radial direction transverse to the direction in which the horizontal shaft portion 105b is mounted to the slide sleeve 113, or to the longitudinal direction of the horizontal shaft portion 105b. Therefore, the mounting operation can be facilitated and rationalized. Further, in the fitted state, the mounting legs 119a are held in plane contact with the mounting inclined surfaces 113f of the clip mounting part 113d, so that the spring forces of the mounting legs 119a can act as forces with which the inclined surface region 105c of the horizontal shaft portion 105b and the inclined surface region 113c of the slide sleeve 113 are pressed against each other.

Further, when the sun visor body 103 pivots, in a region (use position), the spring force of the spring clip 117 acts in a direction that moves the inclined surface region 113c of the slide sleeve 113 away from the inclined surface region 105c of the horizontal shaft portion 105b. Therefore, the spring forces of the mounting legs 119a are preferably set to a magnitude large enough to maintain the plane contact between the inclined surface region 113c of the slide sleeve 113 and the inclined surface region 105c of the horizontal shaft portion 105b. Further, two mounting inclined surfaces 113f on which the mounting legs 119a are mounted are formed on the both sides of the axis, and the normals to the mounting inclined surfaces 113f intersect with each other.

Therefore, the forces of the clamping clip 119 are well balanced on the both sides of the axis, so that the mounted state of the clamping clip 119 can be stabilized.

Figure 6:
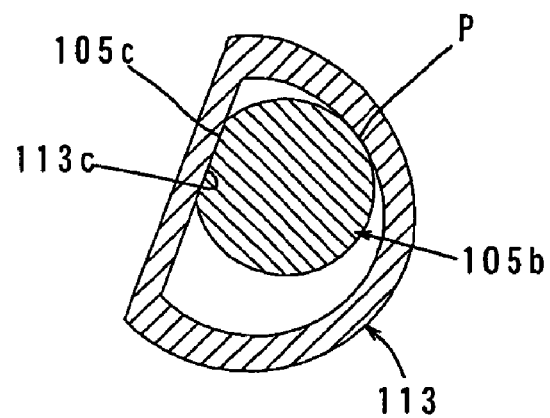
FIG. 6 shows a modification to a construction for preventing relative rotation of a horizontal shaft portion and a slide sleeve.

Further, in this embodiment, the horizontal shaft portion 105b and the slide sleeve 113 are prevented from rotating with respect to each other via the front and rear inclined surface regions 105c, 113c which are formed symmetrically with respect to an axis in their respective circumferential surfaces. However, it is necessary to provide at least one inclined surface region 105c and one inclined surface region 113c. FIG. 6 shows such a construction to which this invention can also be applied. In this case, one inclined surface region 105c and one inclined surface region 113c may be provided in the respective circumferential surfaces (for example, front surfaces) of the horizontal shaft portion 105b and the slide sleeve 113, while a line contact region or point contact region P is provided in a region (in the rear surfaces) of the horizontal shaft portion 105b and the slide sleeve 113 which is opposed to the inclined surface regions 105c, 113c symmetrically with respect to an axis. Further, in order to prevent relative rotation of the horizontal shaft portion 105b and the slide sleeve 113, instead of using the inclined surface regions 105c, 113c, a longitudinally extending V- or U-shaped groove, for example, may be provided in one of the horizontal shaft portion 105b and the slide sleeve 113, and a projection which can engage the groove and slide with respect to the groove may be provided in the other.

Figure 7:
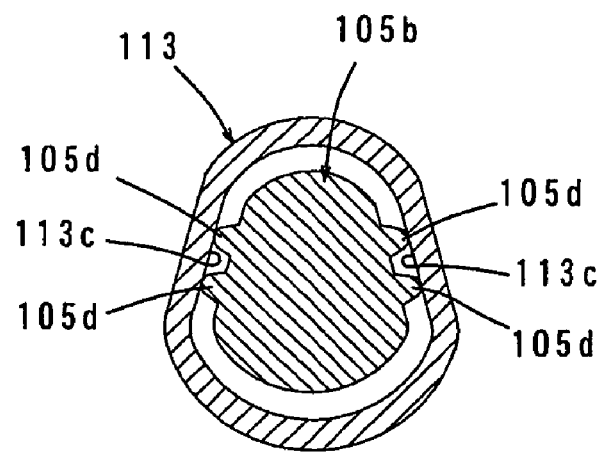
FIG. 7 shows a modification to the construction for preventing relative rotation of the horizontal shaft portion and the slide sleeve.
Figure 8:
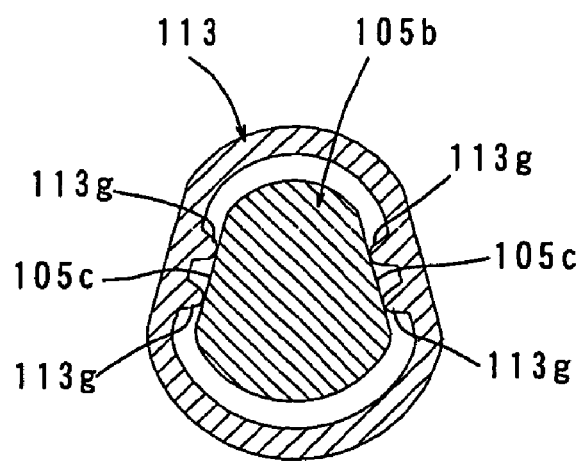
FIG. 8 shows a modification to the construction for preventing relative rotation of the horizontal shaft portion and the slide sleeve.

Further, in this embodiment, the relative rotation of the horizontal shaft portion 105b and the slide sleeve 113 is prevented by plane contact of the inclined surface regions 105c, 113c formed in the respective circumferential surfaces of the horizontal shaft portion 105b and the slide sleeve 113. However, it may be constructed such that such relative rotation is prevented by line or point contact as shown in FIGS. 7 and 8. In the modification shown in FIG. 7, a plurality of projections 105d having a generally angular section are formed on the front and rear outer surfaces of the horizontal shaft portion 105b in its circumferential direction and extend or scatter along its longitudinal direction. The projections 105d are held in line or point contact with plane regions formed in the slide sleeve 113, or the inclined surface regions 113c. In the modification shown in FIG. 8, a plurality of projections 113g having a generally angular section are formed on the front and rear inner surfaces of the slide sleeve 113 in its circumferential direction and extend or scatter along its longitudinal direction. The projections 113g are held in line or point contact with plane regions formed in the horizontal shaft portion 105b, or the inclined surface regions 105c.

Further, in the modifications shown in FIGS. 7 and 8, it can be configured such that the projections 105d, 113g of the horizontal shaft portion 105b or the slide sleeve 113 on one side (for example, the front side) are held in line contact, while the other projections 105d, 113g on the other side (the rear side) are in point contact.

As an example of further modifications, which is not shown, to such a contact structure for preventing relative rotation of the horizontal shaft portion 105b and the slide sleeve 113, a plane region in the form of an inclined surface region may be formed in one of the front and rear outer surfaces of the horizontal shaft portion 105b, and a plurality of projections may be formed on the other and extend or scatter along its longitudinal direction. Correspondingly, a plurality of projections for contact with the inclined surface region of the horizontal shaft portion 105b may be formed on one of the front and rear inner surfaces of the slide sleeve 113 and extend or scatter along its longitudinal direction, while an inclined surface region for contact with the projections of the horizontal shaft portion 105b may be formed on the other.

In a further modification, a plane region in the form of an inclined surface region may be formed in both of the front and rear outer surfaces of the horizontal shaft portion 105b. Correspondingly, a plane region in the form of an inclined surface region for plane contact with the inclined surface region of the horizontal shaft portion 105b may be formed on one of the front and rear inner surfaces of the slide sleeve 113, while a plurality of projections for contact with the inclined surface region of the horizontal shaft portion 105b may be formed on the other and extend or scatter along its longitudinal direction.

In a further different modification, a plane region in the form of an inclined surface region may be formed in both of the front and rear inner surfaces of the slide sleeve 113. Correspondingly, a plane region in the form of an inclined surface region for contact with the inclined surface region of the slide sleeve 113 may be formed on one of the front and rear outer surfaces of the horizontal shaft portion 105b, while a plurality of projections for contact with the inclined surface region of the slide sleeve 113 may be formed on the other and extend or scatter along its longitudinal direction.

As a further example of modifications to the contact structure for preventing relative rotation of the horizontal shaft portion 105b and the slide sleeve 113, for example, a plurality of projections may be formed on the front and rear outer surfaces of the horizontal shaft portion 105b in its circumferential direction and extend linearly along its longitudinal direction. Further, it may be configured such that the vertical directions (normals) with respect to the extending directions of the front and rear projections intersect with each other. Correspondingly, a plurality of projections may be formed on the front and rear inner surfaces of the slide sleeve 113 in its longitudinal direction and extend linearly in a direction transverse to the extending directions of the projections of the horizontal shaft portion 105b, so that the projections of the horizontal shaft portion 105b and the projections of the slide sleeve 113 are held in cross contact with each other.

Further, as an alternative to this construction, a plurality of projections may be formed on the front and rear inner surfaces of the slide sleeve 113 in its circumferential direction and extend linearly along its longitudinal direction. Further, it may be configured such that the vertical directions (normals) with respect to the extending directions of the front and rear projections intersect with each other. Correspondingly, a plurality of projections may be formed on the front and rear outer surfaces of the horizontal shaft portion 105b in its longitudinal direction and extend linearly in a direction transverse to the extending directions of the projections of the slide sleeve 113, so that the projections of the horizontal shaft portion 105b and the projections of the slide sleeve 113 are held in cross contact with each other.

Further, in this embodiment, the structure for clamping the clamping clip 119 onto the slide sleeve 113 is constructed such that the mounting legs 119a extend obliquely toward the opening of the clamping clip 119 and are held in plane contact with the mounting inclined surfaces 113f of the clip mounting part 113d. However, it may be constructed such that the mounting legs 119a are held in line or point contact with the clip mounting part 113d. Specifically, a plane region may be formed in one of the contact regions of the mounting legs 119a of the clamping clip 119 and the clip mounting part 113d of the slide sleeve 113, while projections may be formed on the other, so that the projections are held in line or point contact with the plane region.

Further, although, in this embodiment, the clamping clip 119 has a generally triangular ring-like shape with an open top, the clamping clip 119 may have a closed structure without an opening as long as it can apply a spring force in the radial direction in the fitted state on the clip mounting part 113d of the slide sleeve 113.

DESCRIPTION OF NUMERALS 101 sun visor for vehicles
103 sun visor body
105 support shaft
105a vertical shaft portion
105b horizontal shaft portion
105c inclined surface region (plane region, contact region)
105d projection (line contact region or point contact region)
109 support shaft
111 sliding structure
112 support
112a insert portion
112b mounting leg
112c support hole
113 slide sleeve (sliding member)
113a circular portion
113b notch
113c inclined surface region (plane region, contact region)
113d clip mounting part
113e open window
113f mounting inclined surface
113g projection (line contact region or point contact region)
115 case
117 spring clip (clip member)
117a base
117b elastic deflection part
119 clamping clip (clamping device)
119a mounting leg
119b holding part
P line contact region or point contact region

I claim:

1. A sun visor for vehicles comprising:
a sun visor body,
a support shaft that connects the sun visor body to a vehicle,
a sliding member arranged to be allowed to rotate around an axis of the support shaft with respect to the sun visor body and being prevented from moving in a longitudinal direction of the support shaft with respect to the sun visor body, the sliding member being engaged on the support shaft in such a manner as to be allowed to slide in the longitudinal direction of the support shaft with respect to the support shaft and prevented from rotating around the axis of the support shaft with respect to the support shaft,
a spring clip member fastened to the sun visor body and moved together with the sliding member in the longitudinal direction of the support shaft, the spring clip member being allowed to rotate with respect to the sliding member around the axis of the support shaft while applying a predetermined load with respect to the relative rotation, thereby holding the sun visor body in a position to which the sun visor body pivots around the axis of the support shaft with respect to the support shaft and
a clamping device that accommodates a clearance in a circumferential direction between the support shaft and the sliding member and prevents relative rotation of the support shaft and the sliding member, wherein the clamping device is mounted to the sliding member and rotates together with the sliding member.

2. The sun visor as defined in claim 1, wherein the clamping device comprises an elastically deformable elastic member which applies a spring force to the support shaft from a radial direction in such a manner as to maintain the state of contact with the sliding member, thereby accommodating said clearance.

3. A sun visor as defined in claim 1, wherein the clamping device is prevented from moving with respect to the sliding member in the longitudinal direction of the sliding member.

4. The sun visor as defined in claim 1, wherein a plurality of contact regions are provided in the circumferential direction between the support shaft and the sliding member and contact each other in order to prevent relative rotation of the support shaft and the sliding member.

5. The sun visor as defined in claim 4, wherein the clamping device is configured to maintain the state of contact of the contact regions at all times.

6. The sun visor as defined in claim 1, wherein the support shaft and the sliding member have two contact regions provided in the circumferential direction therebetween for contact with each other in order to prevent relative rotation of the support shaft and the sliding member, and the two contact regions have respective plane regions of which vertical directions intersect with each other.

7. The sun visor as defined in claim 1, wherein the support shaft and the sliding member have two contact regions provided in the circumferential direction therebetween for contact with each other in order to prevent relative rotation of the support shaft and the sliding member, and each of the two contact regions comprises at least two line contact parts formed on the support shaft and at least two line contact parts formed on the sliding member for cross contact with the line contact parts of the support shaft, the line contact parts in the two contact regions being arranged such that their vertical directions intersect with each other.

8. The sun visor as defined in claim 5, wherein the clamping device and the sliding member have a contact region provided therebetween and inclined with respect to a direction transverse to the longitudinal direction of the support shaft, and wherein, in the state in which the clamping device is clamped to the sliding member, the clamping device applies a spring force to the support shaft and the sliding member via the inclined contact region in such a manner as to maintain the state of contact between the support shaft and the sliding member.

9. The sun visor as defined in claim 6, wherein, in each of the two contact regions, the plane region is formed in the outer surface of the support shaft, and correspondingly, a plane region for plane contact with the plane region of the support shaft is formed in the inner surface of the sliding member.

10. The sun visor as defined in claim 6, wherein, in each of the two contact regions, the plane region is formed in the outer surface of the support shaft, and correspondingly, a plurality of line contact parts for line contact with the plane region of the support shaft are formed in the inner surface of the sliding member.

11. The sun visor as defined in claim 6, wherein, in each of the two contact regions, the plane region is formed in the outer surface of the support shaft, and correspondingly, a plurality of point contact parts for point contact with the plane region of the support shaft are formed in the inner surface of the sliding member.

12. The sun visor as defined in claim 6, wherein, in each of the two contact regions, the plane region is formed in the inner surface of the sliding member, and correspondingly, a plurality of line contact parts for line contact with the plane region of the sliding member are formed in the outer surface of the support shaft.

13. The sun visor as defined in claim 6, wherein, in each of the two contact regions, the plane region is formed in the inner surface of the sliding member, and correspondingly, a plurality of point contact parts for point contact with the plane region of the sliding member are formed in the outer surface of the support shaft.

14. The sun visor as defined in claim 8, wherein two contact regions are provided in the circumferential direction between the clamping device and the sliding member and contact each other, and the two contact regions have respective plane regions of which vertical directions intersect with each other.

* * * * *